March 30, 1965    C. G. P. OLDERSHAW    3,175,561
METHOD AND APPARATUS FOR STRIPPING BRUSSELS SPROUTS
Filed Nov. 6, 1962    2 Sheets-Sheet 1
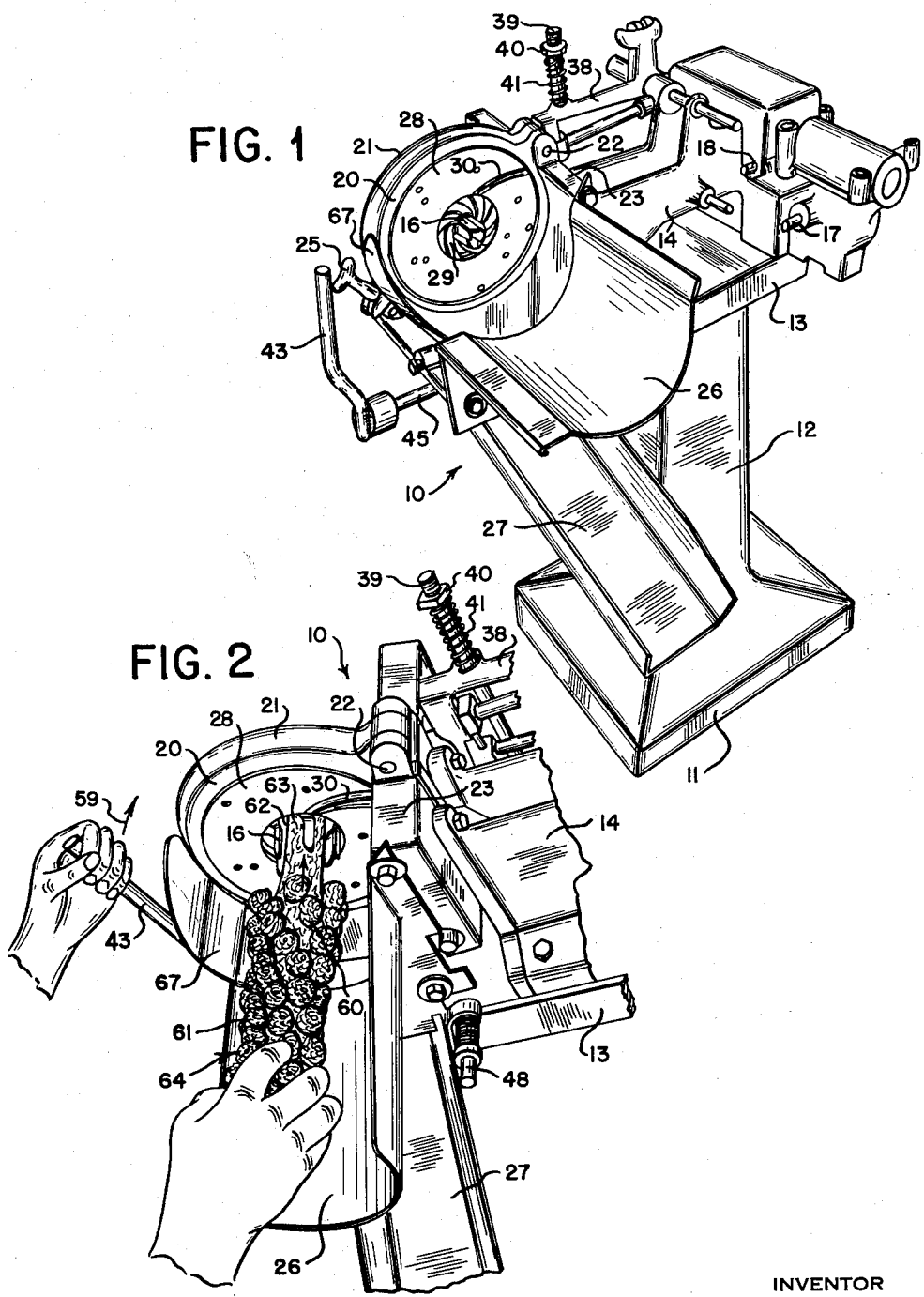
INVENTOR
C.G. Peter Oldershaw
BY
ATTORNEYS March 30, 1965   C. G. P. OLDERSHAW   3,175,561
METHOD AND APPARATUS FOR STRIPPING BRUSSELS SPROUTS
Filed Nov. 6, 1962   2 Sheets-Sheet 2
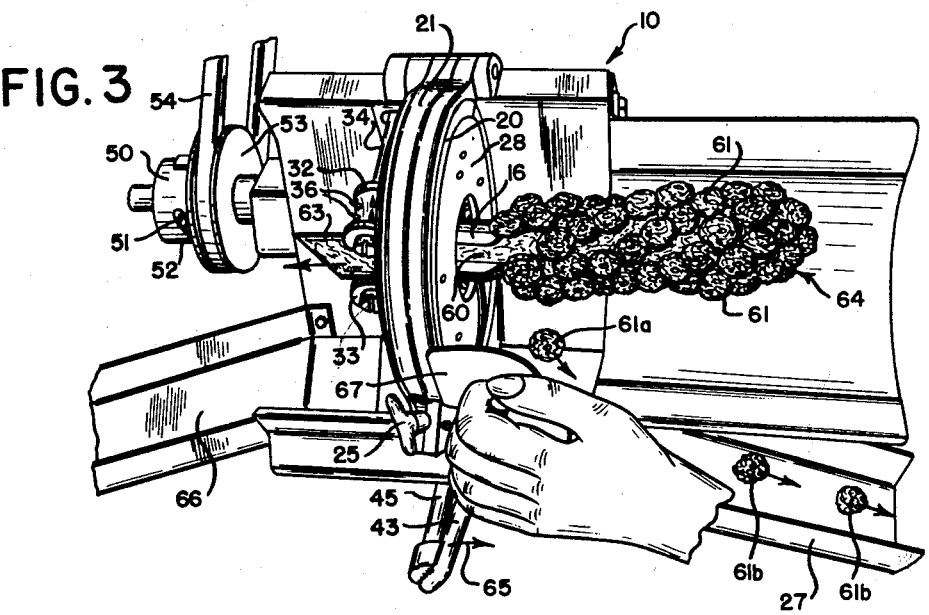
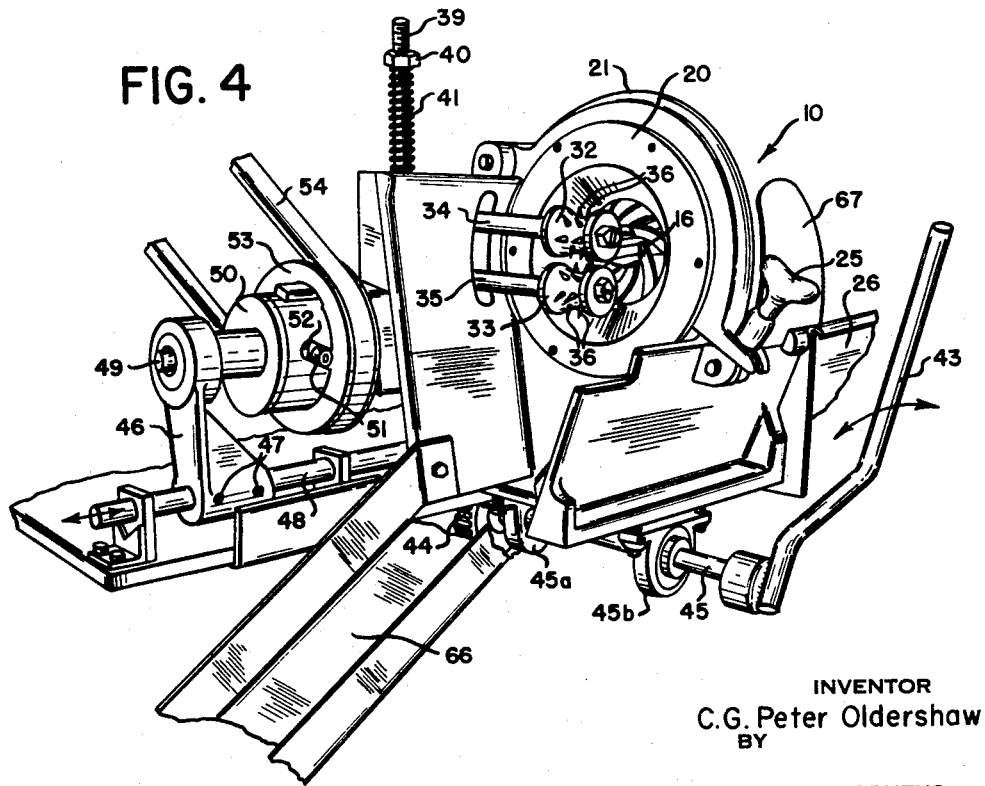
INVENTOR
C.G. Peter Oldershaw
BY
ATTORNEYS

United States Patent Office 3,175,561
Patented Mar. 30, 1965

3,175,561
METHOD AND APPARATUS FOR STRIPPING BRUSSELS SPROUTS
Charles G. Peter Oldershaw, Avon, N.Y., assignor to General Foods Corporation, White Plains, N.Y., a corporation of Delaware
Filed Nov. 6, 1962, Ser. No. 235,729
14 Claims. (Cl. 130—30)

This invention relates to a method and apparatus for removing Brussels sprouts from their stalks. More particularly, it concerns such an apparatus and process in which sprouts are stripped or cut from their stalks by means which require a minimum of supervision by a human agency.

The Brussels sprouts plant is a variety of cabbage which in its seedling stage closely resembles the prosaic cabbage, but later forms an erect stalk about two to three feet high along which auxiliary buds develop into small heads or sprouts. While the sprouts are similar in appearance to a cabbage head, they are generally only about an inch in diameter. Brussels sprouts plants have been grown somewhat sparingly in the United States, primarily because of the cost of handling the sprouts in order to bring them in a fresh or frozen condition to the consumer. One difficulty has been that Brussels sprouts plants have a proclivity to reach maturity unevenly, i.e., all the sprouts on the same stalk do not ripen simultaneously so that the stalk, itself, cannot be harvested without the waste of a substantial quantity of sprouts. As a result, pickers have to cover the same fields at successive intervals in order to harvest all the sprouts which mature during the harvest season. Such expense in picking greatly added to the cost of furnishing sprouts to the consumer. Recently, however, at least one variety of Brussels sprouts plants has been developed in which substantially all of the sprouts on a stalk mature at approximately the same time.

Even with the possibility that the stalks with their matured sprouts connected thereto can now be harvested, the cost of having workers hand-strip the sprouts from their stalks still adds greatly to the cost of handling the vegetable. Yet Brussels sprouts, because of their unique growth habit, are not easily amenable to stripping by a machine, and prior to my invention, there was no machine in commercial use in the United States which stripped Brussels sprouts from their stalks and no process for stripping Brussels sprouts which utilized such a machine.

The primary object of the present invention is to provide a method and apparatus for automatically stripping Brussels sprouts from their stalks. Such a process provides for marked economies in the handling of the sprouts by reducing the number of workers formerly required to strip a given quantity of Brussels sprouts while only moderately increasing the capital expenditure necessary to effect such stripping.

According to the method of the present invention, Brussels sprouts are stripped from their stalk by directing the stalk, butt end first, into an orifice formed by a plurality of knives that are held apart so that they do not cut into the stalk. The butt is gripped after it has passed through the orifice and held so that the stalk is supported at its butt end by the rolls both as the rolls first grip the stalk and as the stalk is advanced by the rolls. The stalk is then advanced in the direction of the butt and the knives moved together so that they sever the Brussels sprouts at the juncture of the sprouts and the stalk. In this manner, the entire stalk is advanced through the orifice, the knives being brought closer together as the stalk tapers until the tip of the stalk has passed through the orifice.

Preferably, the stalk is advanced through the orifice by means of two counter-rotating rolls into the nip of which the butt is inserted. Rotation of the rolls thus serves to advance the stalk, which is held between the rolls. Preferably, the rolls are urged together so that they will continue to grip the stalk firmly between them as that stalk tapers toward its tip. In the most preferred embodiment of the apparatus, the knives that sever the sprouts from their stalk are rotatable so that they uniformly cut sprouts wherever the sprouts grow on the circumference of the stalk. In this embodiment the stalk is held solely by the rotatable rolls.

The apparatus of the present invention bears a relationship to the machine disclosed in U.S. Patent No. 2,787,273 to C. E. Kerr and entitled "Green Corn Cutting Machine." Several important changes have been made in the apparatus disclosed in that patent, however, and that patent did not contemplate the use of its disclosed apparatus to strip Brussels sprouts. My apparatus comprises a knife carrier and at least one Brussels sprouts cutting knife mounted on the carrier. Generally, there will be a multiplicity of knifes used. Feed means grasps a stalk of Brussels sprouts and advances the stalk along a predetermined path of movement with respect to the cutting knives. Means are provided for adjusting the knives on their carrier with respect to that path of movement. In particular, the feed means is located to the rear of the cutting knives with respect to the path of movement so that the stalk is grasped by the feed means and pulled past the cutting knives solely from a location to which parts of the stalk advance after passing the cutting knives. The stalk is free of support in front of the cutting knives. In this important respect, the present apparatus differs from that disclosed in U.S. Patent No. 2,787,273, wherein feed means are located both in front and to the rear of the cutting knives.

In my apparatus, rotating rolls are preferred as the feed means. These rolls may be formed with puncturing projections extending outwardly therefrom in the direction of the nip formed by the rolls. By means of this structure the relatively woody butt end of the Brussels sprouts stalk is firmly held in that nip and the stalk advanced upon counter rotation of the rolls. It is preferred that the knife or knives on the carrier be manually controllable with respect to the path of movement of the Brussels sprouts stalk. By manual control the knife or knives can be moved away from the path of movement while the butt end of the stalk is being inserted in the feed means and then brought into a position closer to the path of movement so that the cutting knives can sever sprouts from their stalk. If any sprouts are severed but still undesirably in the cutting zone, means for ensuring removal of such sprouts may be provided. The removal means advantageously includes a rotatable plate which has a central orifice larger than the stalk and located in the path of movement thereof. In its most preferred form, the plate has a raised ridge on its front face so that any sprouts which are still in the cutting zone and have not fallen therefrom by gravity will contact the front face of the plate and be knocked away as the raised ridge brushes against the sprouts.

These and other objects, features and advantages of the present invention will be more apparent when considered in connection with the drawings illustrating a preferred embodiment of the apparatus and method of the invention, which drawings form a part hereof, and in which:

FIG. 1 is a perspective view of the preferred apparatus taken from the front of the machine in the general direction of the cutting head;

FIG. 2 is an enlarged perspective view of part of the machine taken from above and to the front of the cutting head and illustrating the insertion of a stalk of Brussels sprouts through the orifice in the cutting head;

FIG. 3 is a perspective view taken from the side of the machine and showing a stalk of Brussels sprouts held by the feed means and being advanced through the orifice in the cutting head; and FIG. 4 is a perspective view taken from the rear and side of the machine and showing features of construction including the feed means thereof.

Referring now to the drawings and in particular to FIGS. 1 and 2 thereof, the Brussels sprouts stripper 10 is supported on a base 11 from which a column 12 extends upwardly to a pedestal 13, which serves to support the apparatus. Much of the apparatus is mounted in operative position on a casting 14, which is supported by pedestal 13.

As pointed out hereinbefore, the apparatus illustrated in FIGS. 1 to 4 is a modified form of the embodiment of a green corn cutting machine illustrated and described in U.S. Patent No. 2,787,273, to Kerr. One modification which is immediately apparent in FIGS. 1 and 2 is the lack of the forward feed rolls that lie in front of the knives and are used in Kerr to drive his front feed rolls. Instead, only shaft stubs 17 and 18 remain. The primary components illustrated in FIGS. 1 and 2 are a cutting head 20 which is held in place by means of a clamp ring pivotally mounted by means of pin 22 on frame brackets 23. Wing nut 25 serves to keep clamp ring 21 in locked position. Brussels sprouts knives 16 are mounted on the cutting head 20 in the same manner as the corn cutting knives are mounted in U.S. Patent No. 2,787,273. The Brussels sprouts cutting knives 16, however, are somewhat longer than the corn cutting knives and protrude a short distance outwardly away from the cutting head 20 in the direction from which the stalks are to be inserted.

Also, to the front of the machine in the direction from which the stalks are to be inserted is a feed trough 26 and a chute 27 by means of which sprouts cut from a Brussels sprouts stalk are discharged. Another part of the present apparatus which is different from the embodiment described in the Kerr patent is the flinger plate 28 which has a central orifice 29 therein. Flinger plate 28 is rigidly mounted on and rotates with the cutting head 20, and Brussels sprouts cutting knives 16 extend through the orifice 29 and outwardly in the general direction of the feed trough 26. A raised ridge 30 on the front surface of the flinger plate 28 functions to knock away any Brussels sprouts which remain in the cutting zone and do not fall by gravity toward the chute 27.

As seen in FIGS. 3 and 4, upper and lower feed rolls 32 and 33 are positioned directly to the rear of the cutting head 20. These feed rolls are mounted on their respective shafts 34 and 35 for rotation in opposite directions, feed roll 32 being moved clockwise and feed roll 33 being moved counterclockwise as seen in FIG. 4. Each of the feed rolls has a series of puncturing projections 36 on its periphery, the projections 36 extending into the nip formed between the upper and lower feed rolls. As described in detail in U.S. Patent No. 2,787,273, means are provided for continuously urging rolls 32 and 33 together so that they will grasp and hold material in their nip. The same means is utilized in the apparatus illustrated in FIGS. 1 to 4 herein, and portions of that means are seen in FIGS. 1, 2 and 4 herein. Thus, in FIG. 1, upper equalizing arm 38 is shown, together with vertical rod 39 the upper end of which is threaded to accommodate nut 40, which asserts pressure on upper equalizing arm 38 by means of a spring 41 interposed between the arm and the nut. Vertical rod 39, nut 40 and spring 41 are also illustrated in FIGS. 2 and 4.

Seen in each of FIGS. 1 to 4 is a handle 43, which is used to manually separate or bring together the knives 16. Where in U.S. Patent No. 2,787,273 the corn cutting knives are brought together by spring means supplementing the centrifugal force of the knives as the knives rotate, it is desired in the present invention that the movement of the knives toward and away from a position in which they contact and cut the Brussels sprouts from their stalks should be manually and positively manipulatable. By the term "positively" is meant without use of springs or other devices designed to transmit motion by utilization of their elastic properties. Such manual and positive change of knife position is effected by a rack and pinion linkage, which is viewable in part in FIG. 4. The pinion is identified by reference number 44; the rack is fixed to the underside of actuating shaft 48 and engages the bottom surface of the pinion. Pinion 44 is rotated by manual movement of handle 43, the handle being fixed to the end of horizontal rod 45 on which pinion 44 is fixedly mounted. Rod 45 rotates in bearings 45a and 45b, which are bolted to the underside of the casting 14. By the means disclosed in the Kerr patent, movement of handle 43 causes actuating shaft 48 to move either to the right or to the left as viewed in FIG. 4, whereupon radially extending arm 46 fixedly mounted on actuating shaft 48 by means of set screws 47 is likewise moved to the right or to the left. Movement of arm 46 moves cam 50 either to the right or left as seen in FIG. 4 on inner rotating shaft 49, such movement of cam 50 causing cam follower 51 to move in helical slot 52 in the cam 50 to effect inward and outward movement of Brussels sprouts knives 16 by the same means as shown in the Kerr patent. The present linkage, however, provides for positive control over inward and outward movement of the knives 16, whereas Kerr employs the centrifugal force developed by his rotating knives in conjunction with a spring biasing a cam follower against a cam to move them inwardly. V-belt 54 mounted on pulley 53 transmits rotary motion from the motor (not shown) to rotate the cutting head 20 through internal drive gears (not shown).

Because of the inherent differences between Brussels sprouts and corn, the knives illustrated in FIG. 7 of the Kerr patent are not suitable for severing Brussels sprouts from their stalks. I prefer to change the Kerr cutting knife so that the heel does not ride on the cut surface of the stalk, but clears that surface. This permits the knives to be closed to follow the natural taper of stalks. Instead, the cutting edge rides on the surface of the stalk. Further, the perpendicularly extending portion of the Kerr blade is approximately doubled in length for use in my Brussels sprouts stripper so that the larger sprouts can fall clear of the cutting head.

The operation of the apparatus illustrated in FIGS. 1 to 4 to effect the severing of Brussels sprouts from their stalks will best be seen by reference to FIGS. 2 and 3 of the drawings. A stalk 60 having Brussels sprouts 61 extending outwardly therefrom is inserted in the orifice 62 with the knives 16 spread apart by movement of handle 43 in the direction of arrow 59 of FIG. 2. The stalk 60 is inserted into the orifice 62 and the center aperture 29 in flinger plate 28 with its butt end 63 first. The tip 64 of the Brussels sprouts stalk 60 extends away from the cutting knives 16. Butt end 63 is then pushed between knives 16 until the butt 63 enters the nip formed by feed rolls 32 and 33, in which position these rotating rolls grasp and pierce the stalk 60 by means of peripherally spaced puncturing elements 36. The human agency which has been used to insert the Brussels sprouts stalk 60 into the nip between feed rolls 32 and 33 may be withdrawn at this time or shortly thereafter, and the stalk will be maintained in a substantially horizontal position between the feed rolls.

As the feed rolls rotate, the sprouts 61 on the stalk 60 are drawn in the direction of the cutting head 20. When that portion of the stalk 60 which carries the sprouts 61 reaches the knives 16, the operator moves the knives 16 toward closed position by means of the handle 43 by rotating the handle in the direction of the arrow 65 in FIG. 3. It will be apparent that as the stalk 60 tapers towards the tip 64, the knives 16 will be moved closer and closer together until the tip 64 has passed through central orifice 62 between the knives. After such passage, the knives may be reopened to a maximum extent by manipulation of handle 43 prior to the insertion of the butt end of another stalk of Brussels sprouts between those knives. After the Brussels sprouts 61 have been severed by rotating knives 16 from their stalk 60, they either fall by gravity from the cutting zone or come into contact with flinger plate 28 and its raised ridge 30. Those sprouts that contact flinger plate 28 are knocked from the cutting zone to one side thereof, some falling against guard 67 and then downwardly by gravity toward discharge chute 27, as illustrated in FIG. 3 by sprout 61a. Sprouts 61b are shown in position on chute 27 being directed to a receiving container. The stalks 60 from which the sprouts 61 have been severed pass through the nip between feed rolls 32 and 33 and drop by gravity onto a further chute 66 on which they are directed to a refuse container.

The embodiment of the apparatus of the present invention illustrated in FIGS. 1 to 4 does not disclose completely every detail of that apparatus. Since the apparatus is fairly complex and is a modification of that illustrated and described in U.S. Patent No. 2,787,273, those features which are clearly pointed out in that patent have not been redescribed for the sake of brevity, and the disclosure of that patent is expressly incorporated herein by reference.

It will be apparent that certain alterations and modifications of the method and apparatus illustrated in the drawings and described herein will be obvious to those skilled in this art and will be made without departing from the scope of this invention. All such alterations are deemed to be included within the purview of my invention, which is to be limited only by the scope of the following appended claims.

What is claimed is:

1. The method of stripping Brussels sprouts from a stalk having a relatively wide butt and tapering therefrom to a relatively narrow tip, which comprises directing the stalk butt first into the orifice formed by a plurality of knives held apart so that they do not sever the stalk, rotating said knives around said orifice, gripping the butt and advancing the stalk through the orifice in the direction of the butt, positively moving the knives together so that they sever sprouts at the junctures of the sprouts and the stalk and continuing to advance the stalk while positively moving the knives together as the stalk tapers until the tip of the stalk has passed through the orifice.

2. The method of stripping Brussels sprouts from a stalk having a relatively wide butt and tapering therefrom to a relatively narrow tip, which comprises directing the stalk butt first into the orifice formed by a plurality of knives held apart so that they do not sever the stalk, rotating said knives around said orifice, inserting the butt into the nip formed by rotatable rolls so that the stalk is gripped by the rolls and held in the nip, rotating the rolls to advance the stalk through the orifice in the direction of the butt, positively moving the knives together so that they sever sprouts at the juncture of the sprouts and the stalk, and continuing to rotate the rolls to advance the stalk while positively moving the knives together as the stalk tapers until the tip of the stalk has passed through the orifice.

3. The method of stripping Brussels sprouts from a stalk having a relatively wide butt and tapering therefrom to a relatively narrow tip, which comprises directing the stalk butt first into the orifice formed by a plurality of knives held apart so that they do not sever the stalk, rotating said knives around said orifice, inserting the butt into the nip formed by a pair of rotatable rolls so that the stalk is gripped by the rolls and held in the nip, rotating the rolls to advance the stalk through the orifice in the direction of the butt, positively moving the knives together so that they sever sprouts at the junctures of the sprouts and the stalk, and continuing to rotate the rolls to advance the stalk while positively moving the knives together and simultaneously urging the rolls together as the stalk tapers until the tip of the stalk has passed through the orifice.

4. The method of stripping Brussels sprouts from a stalk having a relatively wide butt and tapering therefrom to a relatively narrow tip, which comprises directing the stalk butt first into the central orifice formed by a plurality of rotatable knives held apart so that they do not sever the stalk, inserting the butt into the nip formed by a pair of rotatable rolls so that the stalk is gripped by the rolls and held in the nip, rotating the rolls to advance the stalk through the orifice in the direction of the butt, rotating and positively moving the knives together so that they sever sprouts at the junctures of the sprouts and the stalk, and continuing to rotate the rolls to advance the stalk while rotating the knives and positively moving them together as the stalk tapers until the tip of the stalk has passed through the orifice.

5. A Brussels sprouts stripper, comprising a rotatable knife carrier, at least one Brussels sprouts cutting knife mounted on said carrier and rotatable therewith to define a cutting orifice, feed means for gripping a stalk of Brussels sprouts and advancing said stalk through said orifice along a predetermined path of movement with respect to said cutting knife, and means for positively adjusting said knife on said carrier to decrease the size of the orifice, said feed means being located to the rear of said cutting knife in said path of movement so that said stalk is gripped by said feed means and pulled past said cutting knife solely from a location to which parts of said stalk advance after passing said cutting knife.

6. A Brussels sprouts stripper, comprising a rotatable knife carrier, at least one Brussels sprouts cutting knife mounted on said carrier and rotatable therewith to define a cutting orifice, feed means for gripping a stalk of Brussels sprouts and advancing said stalk through said orifice along a predetermined path of movement with respect to said cutting knife, said feed means including counter-rotatable rolls spaced from each other to form a nip therebetween, said stalk being disposed in said nip and held by said rolls for movement with the rotation of said rolls, and means for positively adjusting said knife on said carrier to increase and decrease the size of said orifice, said rolls being located to the rear of said cutting knife in said path of movement so that said stalk is gripped by said rolls and pulled past said cutting knife solely from a location to which parts of said stalk advance after passing said cutting knife.

7. A Brussels sprout stripper as claimed in claim 6, at least one of said rolls being formed with puncturing projections extending outwardly therefrom in the direction of said nip.

8. A Brussels sprouts stripper, comprising a rotatable knife carrier, a multiplicity of Brussels sprouts cutting knives mounted on said carrier and rotatable therewith to define a cutting orifice, feed means for gripping a stalk of Brussels sprouts and advancing said stalk through said orifice along a predetermined path of movement with respect to said cutting knives, a manually operative handle, positive acting means responsive to operation of said handle for adjusting said knives on said carrier to increase and decrease the size of said orifice, said feed means being located to the rear of said cutting knives in said path of movement so that said stalk is gripped by said feed means and pulled past said cutting knives solely from a location to which parts of said stalk advance after passing said cutting knives, and means mounted on said carrier and located between said cutting knives and said feed means for discharging from the vicinity of said knives sprouts remaining there after they have been severed from their stalk by said knives.

9. A Brussels sprouts stripper as claimed in claim 8, said discharging means comprising a rotatable plate having a central orifice at least as large as the maximum size of said cutting orifice and in said path of movement.

10. A Brussels sprouts stripper as claimed in claim 9, said plate having a raised ridge on its front face with respect to said path of movement.

11. The method according to claim 1 including the step of discharging the severed sprouts from the vicinity of said orifice while said stalk is passing therethrough.

12. The invention according to claim 11 wherein said discharging of the sprouts is effected by flinging said sprouts outwardly away from said orifice.

13. The invention according to claim 8 wherein said carrier is driven by a pair of drive shafts coupled to one another by an adjustable camming means loosely mounted on one of said shafts and driven by the other of said shafts, said camming means being axially shiftable along said one shaft and formed with a helical cam slot having opposed surfaces engaging opposite surfaces of a cam follower fast on said one shaft, whereby axial shifting of said camming means varies the rotational position of said one shaft relative to said other shaft to effect a corresponding adjustment in the size of said cutting orifice.

14. The invention according to claim 13 wherein the means for axially shifting said camming means includes a pinion and a manually rotatable handle integral therewith, said pinion when manually rotated in one direction axially shifting said camming means to positively increase the size of asid cutting orifice, and when manually rotated in the opposite direction axialy shifting said camming means to positively decrease the size of said cutting orifice.

References Cited by the Examiner
UNITED STATES PATENTS
2,787,273   4/57   Kerr _____ 130—9.2

T. GRAHAM CRAVER, *Primary Examiner.*

ANTONIO F. GUIDA, ARNOLD RUEGG, *Examiners.*